United States Patent [19]

Donnelly et al.

[11] Patent Number: 5,086,994
[45] Date of Patent: Feb. 11, 1992

[54] OSCILLATING AND CONTINUOUS MOTION GEAR DRIVE ASSEMBLY

[75] Inventors: John J. Donnelly, Fort Worth, Tex.; Bruno J. Germano, Centereach, N.Y.

[73] Assignee: Grumman Aerospace Corporation, Bethpage, N.Y.

[21] Appl. No.: 592,255

[22] Filed: Oct. 3, 1990

[51] Int. Cl.⁵ .................. B64C 25/50; F16H 55/17
[52] U.S. Cl. ................... 244/50; 74/404; 74/435
[58] Field of Search ............ 244/50; 74/404, 216.3, 74/329, 435–436, 461, 434; 180/79, 79.3; 280/263, 445, 96

[56] References Cited

U.S. PATENT DOCUMENTS

| | | | |
|---|---|---|---|
| 2,040,933 | 5/1936 | Gillen | 74/435 |
| 3,006,579 | 10/1961 | Frederick | 244/50 |
| 3,035,793 | 5/1962 | Ralph et al. | 244/50 |
| 3,442,146 | 5/1969 | Simpson | 74/435 |
| 3,661,339 | 5/1972 | Shimizu | 74/435 X |
| 4,065,980 | 1/1978 | Ichinose | 74/404 |
| 4,117,739 | 10/1978 | Meier et al. | 74/435 X |
| 4,460,075 | 7/1984 | Sommer | 74/404 X |
| 4,730,788 | 3/1988 | Metcalf et al. | 244/50 |

Primary Examiner—Joseph F. Peters, Jr.
Assistant Examiner—Carla Mattix
Attorney, Agent, or Firm—Bacon & Thomas

[57] ABSTRACT

The present invention pertains to a gear drive assembly that will allow components that are not capable of continuous rotation to be coupled to a component that is capable of continuous rotation. The drive gear assembly includes a drive gear component which is actually comprised of two gear sectors, one used to mesh and drive a driven gear directly and the other used to drive the driven gear in a reverse direction through a reversing cluster gear arrangement. The drive gear sectors are arranged so that when one sector is coupled and driving the driven gear, the other sector is decoupled, and vice-versa. Gear jamming is prevented by properly timing the coupling and decoupling of the drive gear sectors with the driven gear and the reversing cluster gear arrangement. In addition, where gear teeth pairs clash during coupling, provision is made to allow one gear tooth of the clashing pair to deflect and allow passage of the other gear tooth to the proper position. Therefore, the gear drive assembly of the present invention permits constant rotary motion of the drive gear component in either direction while resulting in an oscillating motion of the driven gear component.

14 Claims, 3 Drawing Sheets

OSCILLATING AND CONTINUOUS MOTION GEAR DRIVE ASSEMBLY

BACKGROUND OF THE INVENTION

This invention pertains to the art of gear drive systems wherein a continuous rotary input on a drive gear results in an oscillating output of a driven gear. More particularly, the invention pertains to a gear drive system in which the driven gear is directly driven by the drive gear through one phase of its oscillating motion and driven in the reverse direction of oscillating motion through reverse cluster gearing driven by the drive gear.

Although the gear system of the present invention may have numerous applications including gears in an oscillating fan drive assembly, the system has particular use in an aircraft nosewheel steering system. In many aircraft steering systems, the steering motors are not capable of continuous rotation. The gear system of the present invention will permit such components that are not capable of continuous rotation to be coupled to a component that is capable of continuous rotation such as an airplane nosewheel.

Rotary to oscillating gear drive systems are known in the art as represented by U.S. Pat. No. 4,117,739. In the '739 patent, the drive gear includes two levels of gear teeth. Each level lacks an arcuate segment of gear teeth. As the drive gear is continuously rotated, the upper level of gear teeth will mesh with a first idler gear which in turn drives the output or driven gear. As the drive gear continues to rotate in the same direction, the drive gear will no longer drive the first idler gear due to the arcuate segment of missing gear teeth. Instead, the teeth located on the lower level of the drive gear will engage a second idler gear which in turn will drive the driven gear, through the first idler gear, in a reverse direction.

Providing the various levels of gear teeth on the drive gear in the '739 patent requires a gear of greater thickness and therefore increased weight. Furthermore, at each stage of engagement and disengagement between the drive gear and a respective idler wheel, potential gear jamming exists. No means are provided in the '739 patent to prevent gear jamming from occurring and thus the gear system is susceptible to teeth damage.

In an aircraft nosewheel steering system utilizing a motor which is not capable of continuous rotation, it is sometimes desirable to rotate the nosewheel through 360° or more in maneuvering the aircraft. This is highly desirable in situations in which the aircraft has limited space in which to maneuver such as on an aircraft carrier. In the prior art systems, if the aircraft nosewheel is required to rotate greater than that permitted by the steering motor, the motor must be somehow disconnected from its drive train to the nosewheel. This requires an additional clutch or even disassembly of the drive system.

It is the object of present invention to provide a rotary to oscillating gear drive system wherein the output or driven gear is either directly driven by the drive gear in one direction or indirectly driven by the drive gear in a reverse direction through a reverse cluster gear arrangement. It is also the object of the present invention to provide a means to prevent gear jamming at times of coupling and decoupling of the drive gears. As applied to an aircraft nosewheel steering system, the present invention will permit continuous rotation of the aircraft nosewheel while oscillating the steering motor driven gear. This will prevent damage to the steering motor which would occur if the nosewheel was manually maneuvered beyond the permissible steering limits of the motor.

BRIEF SUMMARY OF THE INVENTION

The present invention provides a gear drive assembly which permits components that are not capable of continuous rotation to be coupled to components that are capable of continuous rotation. In the gear drive assembly, a drive gear is capable of continuous rotation and includes two gear sectors. One gear sector is used to mesh and directly drive a driven gear which is not capable of continuous rotation. The second gear sector is used to drive the driven gear in a reverse direction through a reverse cluster gear arrangement. The gear sectors of the drive gear are arranged so that when one sector is coupled and driving the driven component, the other sector is decoupled, and vice-versa.

The reverse cluster gear assembly serves to drive the driven gear in a reverse direction and to time the recoupling of the drive gear directly to the driven gear. In order to properly time the coupling and decoupling of the gear sectors of the drive gear with the driven gear and the reverse cluster gear assembly respectively, the reverse cluster gear assembly includes means to prevent gear jamming which may occur when gear teeth pairs clash during coupling and decoupling. The reverse cluster gear assembly is arranged to allow one gear tooth of the clashing pair of teeth to deflect and allow the teeth to align themselves to a proper position.

As contemplated by the present invention, when the gear drive assembly is utilized with an aircraft nosewheel steering system having a steering motor which is not capable of continuous rotation, the gear drive assembly permits the aircraft nosewheel to be completely rotated through 360° while protecting the steering motor from damage by oscillating the steering motor driven gear.

These and other objects of the present invention will become more readily apparent by reference to the following detailed description of a preferred embodiment shown in the drawings.

DESCRIPTION OF THE PREFERRED EMBODIMENT

Figure 1:
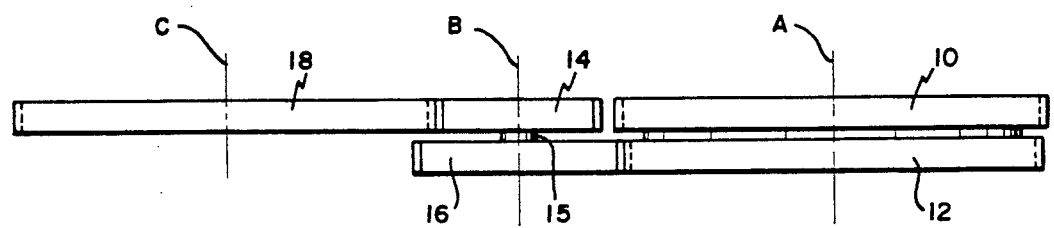
FIG. 1 is a side view showing a gear drive assembly according to the present invention.

In accordance with the preferred embodiment as represented in FIG. 1, the gear drive assembly comprises a drive gear 10, a backdrive gear 12, first and second intermediate backdrive gears 14 and 16, and a driven gear 18. The drive gear 10 and the backdrive gear 12 rotate in unison about common axis A. Drive gear 10 and backdrive gear 12 may be fixedly secured to one another, formed integral with each other, or simply fixedly mounted on a common shaft.

The first intermediate backdrive gear 14 is fixed to shaft 15 along with second intermediate backdrive gear 16 to rotate in unison about common axis B. First intermediate backdrive gear 14 is in constant engagement with driven gear 18. Second intermediate backdrive gear 16 is larger than first intermediate backdrive gear 14 and meshes with backdrive gear 12.

As shown in FIG. 1, drive gear 10, first intermediate backdrive gear 14 and driven gear 18 are located in a first plane. Back drive gear 12 and second intermediate backdrive gear 16 are located in a second plane.

Figure 2:
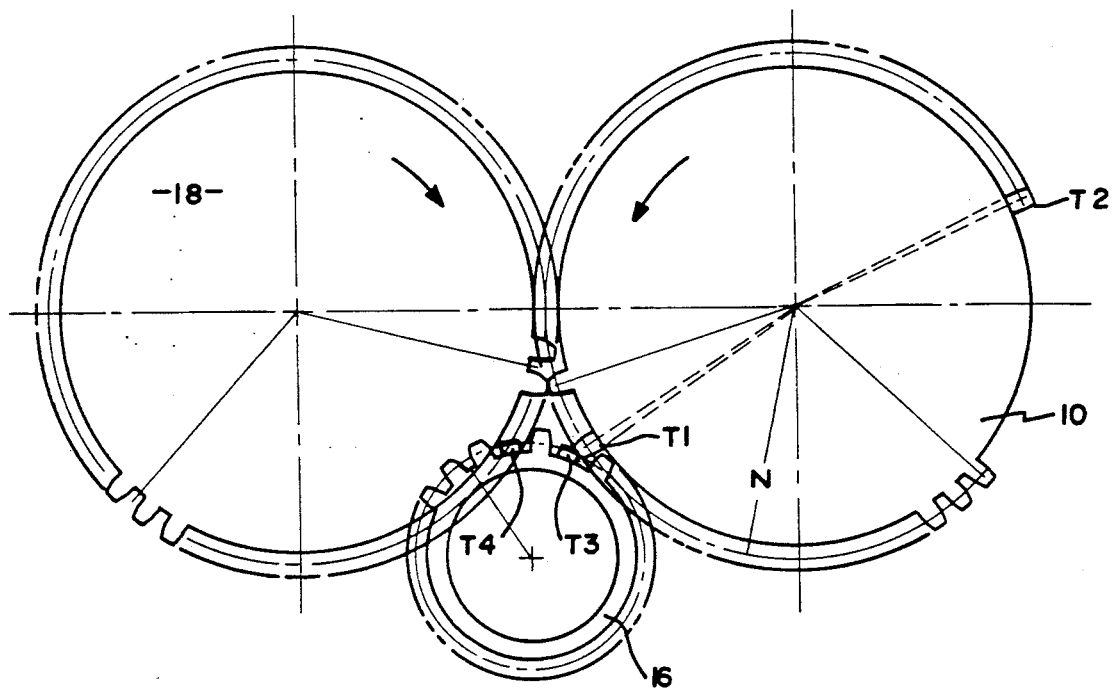
FIGS. 2 and 3 show top views of the gear drive assembly in various driving positions.
Figure 3:
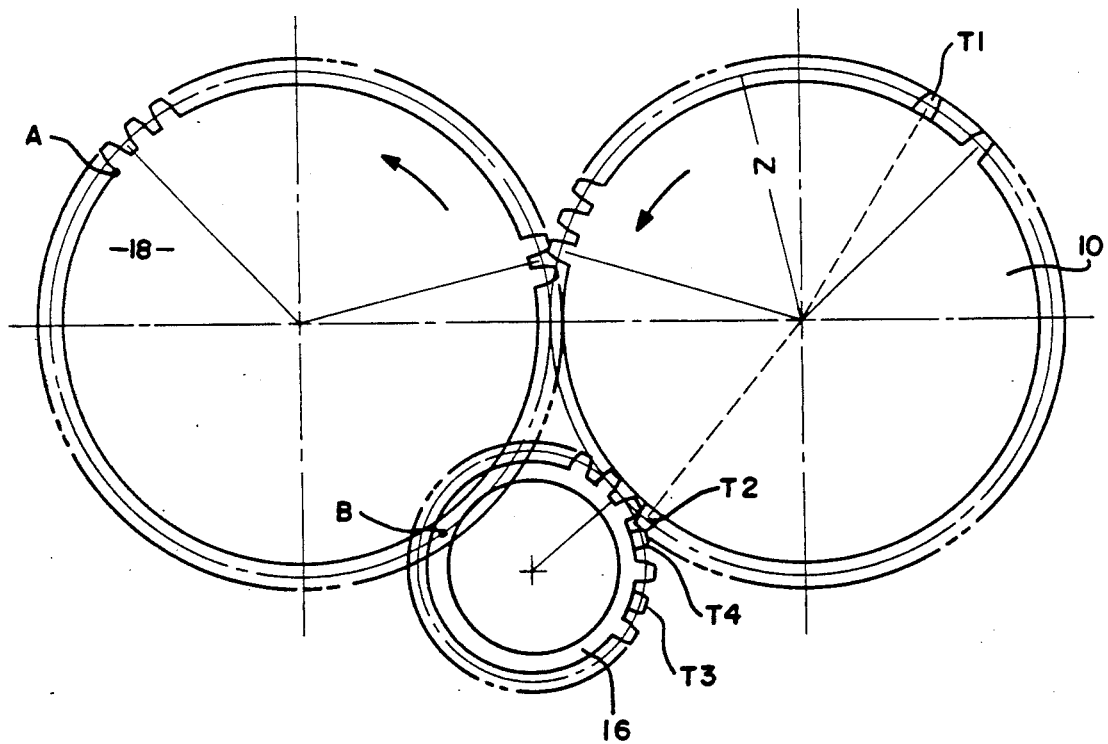

Referring to FIGS. 2 and 3, the driven gear 18 in the preferred embodiment is driven through approximately 120°. The driven gear is shown to include gear teeth about its entire perimeter but may include teeth about only a portion of its perimeter since, effectively, only approximately 190° of teeth, between points A and B in the clockwise direction in FIG. 3, are utilized.

Both drive gear 10 and backdrive gear 12 include arcuate segments, about their respective perimeters, which lack gear teeth. Drive gear 10 has approximately 120° of teeth about its perimeter. Back drive gear 12 includes greater than 180° of teeth about its perimeter. This teeth segment, although not completely shown in the drawings, extends from tooth T1 in the clockwise direction to tooth T2. Therefore, as viewed in FIGS. 2 and 3, both the drive gear 10 and the backdrive gear 12 lack teeth between tooth T2 and the first tooth shown on the drive gear 10 in the clockwise direction. Furthermore, the drive gear 10 and the backdrive gear 12 include overlapping gear teeth segments between tooth T1 and the final tooth in the 120° tooth segment on the drive gear 10 as shown in FIG. 3 in the clockwise direction.

First intermediate backdrive gear 14 constantly meshes with drive gear 18 and may, as in the preferred embodiment, include gear teeth about all of its 360° perimeter. Second backdrive gear 16, depending upon the gear ratio design, may include gear teeth along a substantial portion or its entire perimeter. The second intermediate backdrive gear 16 is larger than first intermediate backdrive gear 14 and includes two indexing teeth T3 and T4. The functioning of these two teeth will be explained more fully below.

Figure 4:
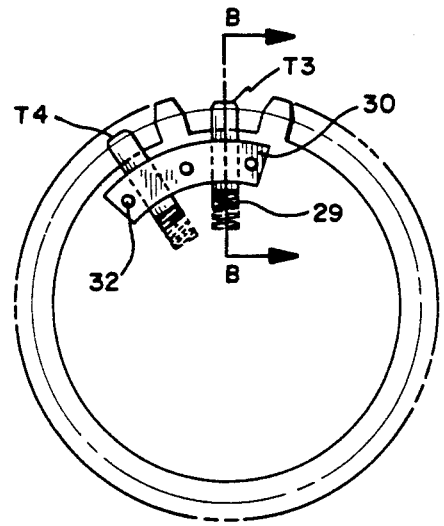
FIG. 4 is a top view of one of the gears in the gear drive assembly showing FIG. 1.

FIG. 4 shows second intermediate backdrive gear 16 isolated from the other gears in the gear drive assembly. As shown, spaced by one gear tooth are a pair of indexing teeth T3 and T4. These indexing teeth are located in grooves formed in the second intermediate backdrive gear 16 and located by means of a plate 30 welded to the gear or secured thereto by any known means in the art at 32.

Figure 5:
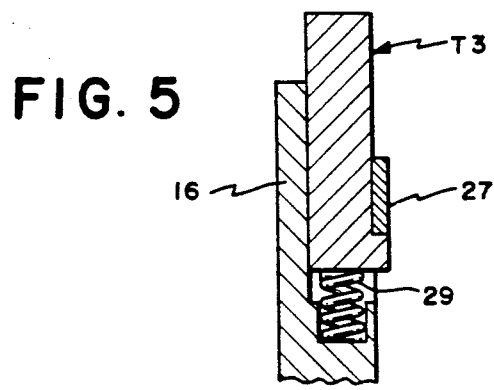
FIG. 5 is a cross-sectional view made along line B—B' in FIG. 4.

As shown in FIG. 5, the tooth T3 is resiliently mounted by a spring 29 which permits tooth T3 to radially deflect. Spring 29 is a compression spring which biases tooth T3 upward as shown in FIG. 5. The indexing teeth T3 and T4 have retainers 27 formed therewith which cooperate with plate 30 and an upstanding portion of the second intermediate gear 16 to locate the indexing teeth. The function of the indexing teeth will become more readily apparent with reference to FIGS. 2 and 3 and a discussion of the movement of the various gears.

With reference to FIG. 2, the drive gear 10 has been driven clockwise through its 120° gear teeth segment. Since this gear segment directly meshes with the 120° tooth segment on driven gear 18, driven gear 18 has also rotated through approximately 120°. It should be noted at this point that although gear 10 has been labeled the drive gear and gear 18 has been labeled the driven gear, at least with respect to this 120° rotation, either gear 10 or gear 18 may do the driving with the other gear being driven. In any event, after the 120° of rotation, it is gear 10 which is arranged to be capable of continued rotation and gear 18 which is not capable of continuous rotation.

FIG. 2 shows drive gear 10 at the point of disengagement with the teeth of driven gear 18. At this time, tooth T1 of backdrive gear 12 engages the teeth of the second intermediate backdrive gear 16. As shown in FIG. 2, it is possible at this transition point that tooth T1 on backdrive gear 12 may clash with indexing tooth T3 on the second intermediate backdrive gear 16. Since tooth T3 is deflectable, any potential clashing of the teeth will result in momentary radial deflection of tooth T3 and jamming of the gear drive assembly will be prevented.

During continued rotation of drive gear 10 from its position shown in FIG. 2 to its position shown in FIG. 3, the backdrive gear 12 drives driven gear 18 in a reverse or counterclockwise direction through second intermediate backdrive gear 16 and first intermediate backdrive gear 14. As shown in FIG. 3, backdrive gear 12 has reached that portion of the gear segment which lacks teeth. At the same time, driven gear 18 has been returned to its initial position and the drive teeth of drive gear 10 may again directly engage with the teeth on driven gear 18. Again, at this transition point, there is potential for clashing of the gear teeth and jamming of the gear drive assembly. Therefore, tooth T2 of backdrive gear 12 engages deflectable tooth T4 on the second intermediate backdrive gear 16 which permits proper alignment and smooth engagement between drive gear 10 and driven gear 18.

Therefore, it can be seen that the drive gear assembly of the present invention permits continuous rotation of drive gear 10 while producing an oscillation of driven gear 18. Gear jamming is prevented by properly timing the coupling and decoupling of the driven gear 18 with the drive gear 10 and the reverse cluster gearing 12, 14, 16. In addition, when gear teeth pairs clash during coupling, provision is made to allow one gear tooth of the clashing pair to deflect and allow passage of the other gear tooth to the proper position. The drive gear ratio of the reversing cluster gears are designed to oscillate driven gear 18 from its position shown in FIG. 2 to its position shown in FIG. 3 as the drive gear 10 rotates 240°. By designing the reversing cluster gears in this manner, the drive gear 10 will properly mesh with the driven gear 18 for the 120° of direct drive.

Figure 6:
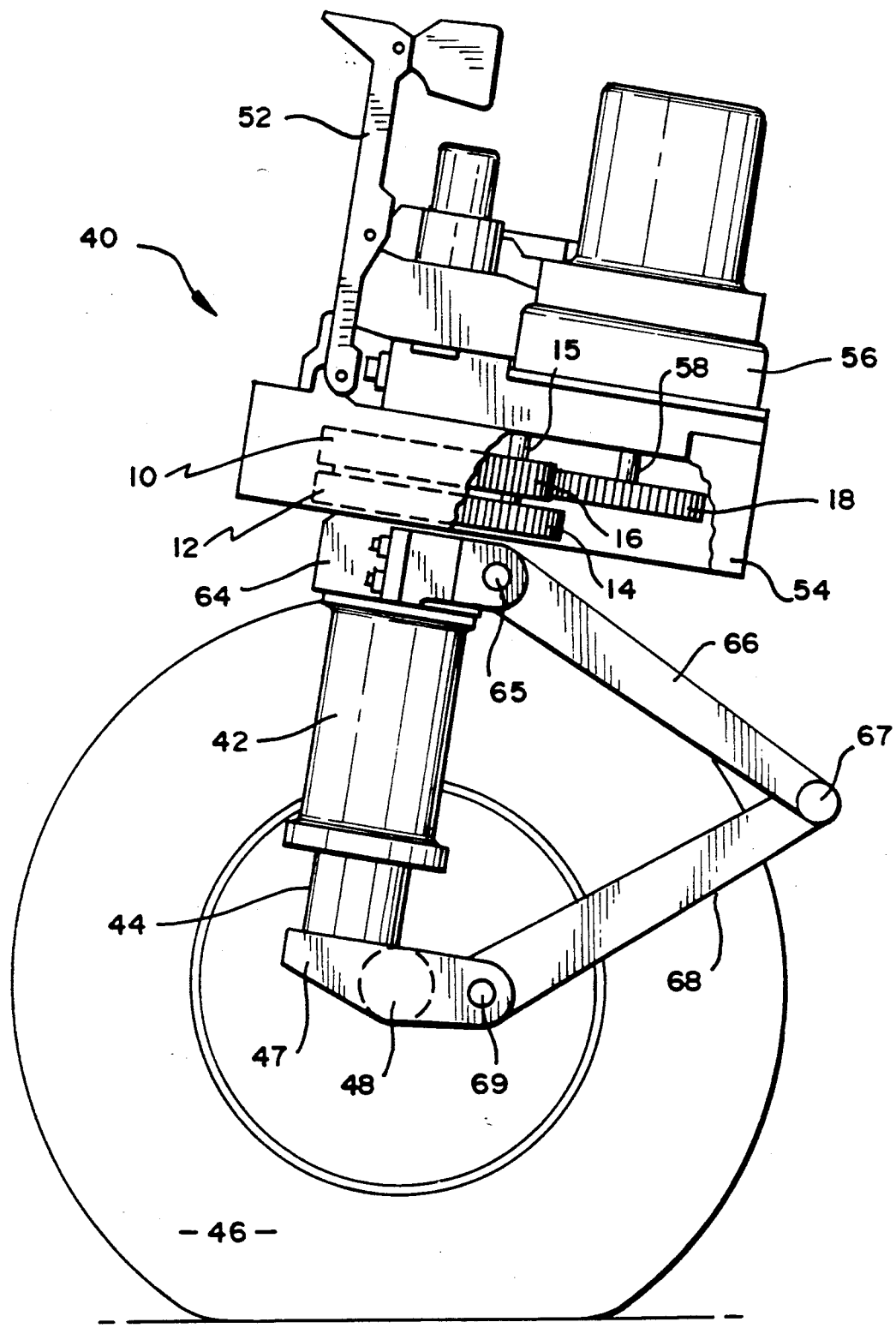
FIG. 6 shows an aircraft nosewheel steering system utilizing the gear drive assembly of the present invention.

Reference will now be made to FIG. 6 which shows an aircraft nosewheel assembly generally indicated at 40 incorporating the gear drive assembly discussed above. In this embodiment, a pair of aircraft nosewheels, only one being indicated at 46, are rotatably mounted about an axle 48. The axle 48 is journaled in a flange member 47. The flange member 47 is either integrally formed with or rigidly secured to inner strut barrel 44. Inner strut barrel 44 is permitted to rotate and reciprocate within outer strut barrel 42 for steering the nosewheels 46 and for absorbing shocks as is commonly known in the art.

Rotatably mounted about the upper strut barrel 42 is a steering collar 64. Torque links 66 and 68 interconnect steering collar 64 and flange member 47. One end of upper torque link 66 is pivotally connected to the steering collar 64 by pin 65. The other end of upper torque link 66 is pivotally connected at pin 67 to one end of lower torque link 68. The other end of lower torque link 68 is pivotally connected to flange member 47 by pin 69. The torque links transmit steering motion of the steering collar 64 to flange member 47, axle 48, and nosewheels 46 while permitting lower strut barrel 44 to reciprocate in upper strut barrel 42 as is commonly known in the art. A bracket 52 is provided for attaching the nosewheel assembly 40 to an aircraft (not shown) by any means known in the art.

Reference will now be made to the steering drive arrangement for the nosewheel assembly. The nosewheel assembly 40 is provided with a steering motor 56. In the preferred embodiment, the steering motor 56 is a rotary vane-type motor having a permissible degree of rotation of approximately 120°. Secured to the output shaft 58 of the rotary vane motor 56 is driven gear 18 of the present gear drive assembly. Intermediate backdrive gears 14 and 16, as previously stated, are secured to shaft 15. Shaft 15 is journaled for rotation in housing 54. Drive gear 10 and backdrive gear 12 are fixed to rotate with steering collar 64.

During normal steering operations of the aircraft, steering motor 56 drives driven gear 18 which directly meshes with drive gear 10 to rotate steering collar 64. The steering motor 56 may steer nosewheels 46 through its permissible 120° of rotation.

There are times, however, when the aircraft and its nosewheel assembly 40 must be maneuvered in rather small areas and which require nosewheels 46 to be rotated through an angle greater than that permitted by steering motor 56. This frequently occurs on aircraft carriers wherein the aircraft is maneuvered manually by use of a tow bar or the like. In prior art nosewheel steering systems, if the steering motor 56 is not capable of continuous rotation, the steering motor must be decoupled prior to manually maneuvering the aircraft or the steering motor will be damaged. By use of the present invention, the steering motor 56 need not be decoupled in order to manually rotate the nosewheels 46 even through 360° of rotation. Prior to the steering motor 56 reaching its steering limit, the gear drive assembly of the present invention will reverse the drive to driven gear 18 and will oscillate the output shaft 58 of the steering motor 56.

Therefore, by use of the gear drive assembly of the present invention, the aircraft nosewheels 46 may be manually maneuvered through any angle without decoupling or damaging steering motor 56. Furthermore, as previously explained with regards to FIGS. 2 and 3, the gear drive assembly of the present invention will automatically decouple, relocate and recouple drive gear 10 and driven gear 18 so that the geometric relationship between these gears is maintained and repeatable, independent of the direction of rotation of the gear drive assembly. Also, gear jamming and clashing of gear teeth pairs is prevented by properly timing the coupling and decoupling of the drive gear sectors of driven gear 18 with the drive gear 10 and the reverse cluster gears 12, 14 and 16.

It should be readily apparent that, although FIG. 6 shows drive gear 10 located above backdrive gear 12, the entire gear drive assembly could be reversed so that drive gear 10 is located below backdrive gear 12 and output shaft 58 of steering motor 56 would extend farther down toward nosewheel 46 such that driven gear 18 still meshes with drive gear 10. Of course, the intermediate backdrive gears 14 and 16 would also be reversed. Also, although disclosed with respect to a particular embodiment, it can be readily seen that various changes and/or modifications may be made without departing from the spirit or scope of the present invention. For example, the gear drive assembly of the present invention may be used with steering and drive systems in other types of vehicles. It is intended, therefore, that the present invention be limited solely by the scope of the following claims:

What is claimed is:

1. A gear drive assembly comprising:
   a drive gear having a first segment including gear teeth extending about a first predetermined arcuate length of the drive gear perimeter and a second segment without gear teeth on its perimeter adjacent the first segment;
   a backdrive gear coaxially mounted to rotate in unison with said drive gear, said backdrive gear having a first segment including gear teeth extending about a second predetermined arcuate length of the backdrive gear perimeter, and a second segment without gear teeth on its perimeter adjacent the first backdrive gear segment;
   a driven gear having gear teeth extending about its perimeter;
   a first intermediate backdrive gear having gear teeth in constant mesh with the gear teeth of said driven gear; and
   a second intermediate backdrive gear having gear teeth extending about at least a portion of its perimeter, said second intermediate backdrive gear being coaxially mounted to rotate in unison with said first intermediate backdrive gear with the gear teeth of said second intermediate backdrive gear being arranged to mesh with the gear teeth of said backdrive gear;
   said gear drive assembly being arranged such that continuous rotation of said drive gear through 360° results in oscillation of said driven gear, with the gear teeth of the first segment of said drive gear directly meshing with the gear teeth of said driven gear to directly drive said driven gear when the drive gear is rotated in one direction over an arcuate length corresponding to said first predetermined arcuate length of said first segment of said drive gear and, upon continued rotation of said drive gear in said one direction, to drive said driven gear in an opposite direction through the gear teeth of the first segment of said backdrive gear directly meshing with the gear teeth of said second intermediate backdrive gear to produce said opposite rotation.

2. A gear drive assembly as claimed in claim 1 wherein said second intermediate backdrive gear includes at least one deflectable gear tooth arranged to permit relative movement between said drive gear and said driven gear through said backdrive gear and said second intermediate gear during periods when the rotational direction of said driven gear changes.

3. A gear drive assembly as claimed in claim 2 wherein said second intermediate backdrive gear includes two deflectable gear teeth spaced by at least one non-deflectable gear tooth.

4. A gear drive assembly as claimed in claim 1 wherein said drive gear, said first intermediate backdrive gear and said driven gear are located in a first plane, and said backdrive gear and said second intermediate backdrive gear are located in a second plane extending parallel to said first plane.

5. A gear drive assembly as claimed in claim 1 wherein said first predetermined arcuate length is approximately 120°.

6. A gear drive assembly as claimed in claim 5 wherein said second predetermined arcuate length is greater than said first predetermined arcuate length.

7. A gear drive assembly as claimed in claim 6 wherein said first and second predetermined arcuate lengths overlap.

8. A gear drive assembly as claimed in claim 1 wherein said driven gear only has gear teeth through approximately 190° of its perimeter.

9. A gear drive assembly as recited in claim 1 wherein said gear drive assembly comprises an airplane nose wheel steering system including a nose wheel which rotates in unison with said drive gear and a steering motor driving the driven gear in response to operator steering motor control commands, whereby manual rotation of the nose wheel and drive gear produces oscillation of the driven gear and steering motor.

10. A vehicle wheel steering system comprising:
a steering motor having an output shaft which is capable of continuous rotation through only a predetermined steering angle;
a driven gear fixedly secured to and rotatable with said output shaft;
a drive gear having a first segment including gear teeth extending around a first predetermined arcuate length of the drive gear perimeter and a second segment without gear teeth on its perimeter adjacent the first segment;
a backdrive gear coaxially mounted to rotate in unison with said drive gear, said backdrive gear having a first segment including gear teeth extending about a second predetermined arcuate length of the backdrive gear perimeter, and a second segment without gear teeth on its perimeter adjacent the first backdrive gear segment;
first and second intermediate backdrive gears coaxially mounted to rotate in unison, said first intermediate backdrive gear being in constant mesh with said driven gear and said second intermediate backdrive gear being arranged to mesh with the first segment of said backdrive gear;
a steerable wheel secured to rotate in unison with said drive gear, said vehicle wheel steering system enabling steering of said steerable wheel through said motor, said driven gear and said drive gear through said predetermined steering angle, said vehicle wheel steering system being also arranged such that continuous rotation of said drive gear through 360° results in oscillation of said driven gear, with the gear teeth of the first segment of said drive gear directly meshing with the gear teeth of said driven gear to directly drive said driven gear when the drive gear is rotated in one direction over an arcuate length corresponding with said first predetermined arcuate length of said first segment of said drive gear and, on continued rotation of said drive gear in said one direction, to drive said driven gear in an opposite direction through the gear teeth of the first segment of said backdrive gear directly meshing with the gear teeth of said second intermediate backdrive gear to produce said opposite rotation.

11. A vehicle wheel steering assembly as claimed in claim 10 wherein said second intermediate backdrive gear includes at least one deflectable gear tooth which permits relative movement between said drive gear and said driven gear through said backdrive gear and said second intermediate gear during periods when the rotational direction of said driven gear changes.

12. A vehicle wheel steering assembly as claimed in claim 11 wherein said second intermediate backdrive gear includes two deflectable gear teeth spaced by at least one non-deflectable gear tooth.

13. A vehicle wheel steering assembly as claimed in claim 10 wherein said drive gear, said first intermediate backdrive gear and said driven gear are located in a first plane, and said backdrive gear and said second intermediate backdrive gear are located in a second plane extending parallel to said first plane.

14. A vehicle wheel steering assembly as claimed in claim 10 wherein said predetermined steering angle is approximately 120°.

* * * * *